US009619971B2

(12) United States Patent
Okuaki et al.

(10) Patent No.: US 9,619,971 B2
(45) Date of Patent: Apr. 11, 2017

(54) GAME MACHINE, CONTROL METHOD OF CONTROLLING COMPUTER USED IN GAME MACHINE, AND COMPUTER PROGRAM

(75) Inventors: Masato Okuaki, Zama (JP); Masao Mizoguchi, Zama (JP); Tomoaki Hirai, Zama (JP)

(73) Assignee: KONAMI GAMING, INC., Las Vegas, NV (US)

( * ) Notice: Subject to any disclaimer, the term of this patent is extended or adjusted under 35 U.S.C. 154(b) by 99 days.

(21) Appl. No.: 14/394,235

(22) PCT Filed: May 23, 2012

(86) PCT No.: PCT/US2012/039034
§ 371 (c)(1),
(2), (4) Date: Apr. 15, 2015

(87) PCT Pub. No.: WO2013/176659
PCT Pub. Date: Nov. 28, 2013

(65) Prior Publication Data
US 2015/0213671 A1 Jul. 30, 2015

(51) Int. Cl.
*G06F 17/00* (2006.01)
*G07F 17/32* (2006.01)

(52) U.S. Cl.
CPC ........ *G07F 17/329* (2013.01); *G07F 17/3225* (2013.01)

(58) Field of Classification Search
None
See application file for complete search history.

(56) References Cited

U.S. PATENT DOCUMENTS 5,611,730 A * 3/1997 Weiss ...................... G07F 17/32 463/20
6,852,031 B1 * 2/2005 Rowe ...................... G07F 17/32 235/375
(Continued)

FOREIGN PATENT DOCUMENTS

JP 2003-236226 A 8/2003
JP 2005-293450 A 10/2005
(Continued)

OTHER PUBLICATIONS

Notice of Reasons for Rejection with English Translation; Dispatched: Mar. 15, 2016.
(Continued)

*Primary Examiner* — Paul A D'Agostino
(74) *Attorney, Agent, or Firm* — Howard & Howard Attorneys PLLC

(57) ABSTRACT

A game machine includes a roulette game unit that selects at least one of pockets each of which is associated with a predetermined privilege by a lottery using motion of a ball, and uses a lottery result of the roulette game unit for provision of the predetermined privilege so that a predetermined privilege associated with a pocket selected by the roulette game unit is provided. And, the game machine stops the provision of the predetermined privilege using the lottery result of the roulette game unit when the roulette game unit satisfies a predetermined stop condition, selects at least one of ball images each of which is associated with the predetermined privilege by an electronic lottery using a video lottery screen, and provides a predetermined privilege associated with a ball image.

13 Claims, 10 Drawing Sheets

(56) References Cited

U.S. PATENT DOCUMENTS

| | | | | |
|---|---|---|---|---|
| 8,419,547 | B1 * | 4/2013 | Radek | H03M 13/2912 370/389 |
| D707,302 | S * | 6/2014 | Inoue | D21/369 |
| 8,851,475 | B2 * | 10/2014 | Nordahl | A63F 9/0406 273/145 C |
| 2002/0155887 | A1 * | 10/2002 | Criss-Puszkiewicz | G07F 17/32 463/29 |
| 2003/0054880 | A1 * | 3/2003 | Lam | G07F 17/3202 463/29 |
| 2004/0266533 | A1 * | 12/2004 | Gentles | G06F 21/32 463/42 |
| 2006/0046818 | A1 * | 3/2006 | Goins | G07F 17/3244 463/16 |
| 2008/0045343 | A1 * | 2/2008 | Sauberman | G07F 17/32 463/42 |
| 2008/0102957 | A1 * | 5/2008 | Burman | G06Q 20/3224 463/42 |
| 2008/0207307 | A1 * | 8/2008 | Cunningham, II | G06F 21/105 463/25 |
| 2009/0005149 | A1 * | 1/2009 | Okuaki | G07F 17/3297 463/17 |
| 2010/0062822 | A1 * | 3/2010 | Frick | A63F 3/06 463/17 |
| 2010/0093419 | A1 * | 4/2010 | Wright | G07F 17/329 463/17 |
| 2011/0018194 | A1 * | 1/2011 | Nicely | A63F 9/0406 273/145 CA |
| 2013/0225254 | A1 * | 8/2013 | Pececnik | G07F 17/326 463/17 |
| 2015/0213671 | A1 * | 7/2015 | Okuaki | G07F 17/3225 463/17 |
| 2015/0348371 | A1 * | 12/2015 | Blazevic | G07F 17/3288 463/11 |

FOREIGN PATENT DOCUMENTS

| | | | |
|---|---|---|---|
| JP | 2006-334327 | A | 12/2006 |
| JP | 2007-37722 | A | 2/2007 |
| JP | 2007-275143 | A | 10/2007 |
| JP | 2008-099828 | A | 5/2008 |
| JP | 2009-020141 | A | 1/2009 |
| JP | 2010-0063544 | A | 3/2010 |
| JP | 2011-147627 | A | 8/2011 |
| JP | 2012-235998 | A | 12/2012 |
| WO | 2013/176659 | A1 | 11/2013 |

OTHER PUBLICATIONS

International Search Report and Written Opinion (PCT/US2012/039034)—Date of Mailing: Aug. 3, 2012.

* cited by examiner

GAME MACHINE, CONTROL METHOD OF CONTROLLING COMPUTER USED IN GAME MACHINE, AND COMPUTER PROGRAM

CROSS REFERENCE TO RELATED APPLICATION

This application is a national stage application of PCT/US2012/039034, filed May 23, 2012, the disclosure of which is hereby incorporated by reference in its entirety.

TECHNICAL FIELD

The present invention relates to a game machine or the like that provides a predetermined privilege using a physical lottery mechanism.

BACKGROUND ART

There is a physical lottery mechanism that selects at least one of choices by a lottery using motion of a physical lottery medium. A game machine that provides a predetermined privilege using such a physical lottery mechanism has been known (for example, see Patent Literature 1). There is Patent Literature 2 as another related art of the invention. Patent Literature 1: Japanese Patent No. 4331173 and Patent Literature 2: Japanese Patent No. 4704455.

SUMMARY OF INVENTION

Technical Problem

The physical lottery mechanism used in the game machine disclosed in Patent Literature 1 uses motion of the physical lottery medium for drawing choices by lottery. Thus, the result of the lottery may be affected by a physical phenomenon such as vibration, shaking, or an impact. Such physical phenomenon may occur by wrongdoing. In other words, the physical lottery mechanism may be affected by wrongdoing using the physical phenomenon. Further, the lottery result may be affected even when an inadequate operation (malfunction) occurs in the physical lottery mechanism. In these cases, it is difficult to guarantee an appropriate lottery result. Further, an operation state management system disclosed in Patent Literature 2 manages a state of a game machine based on an acquired operation state. However, the system disclosed in Patent Literature 2 does not guarantee an appropriate lottery result when wrongdoing or the like is made on the physical lottery mechanism.

In this regard, an object of the present invention is to provide a game machine that appropriateness of a lottery result can be guaranteed, a control method of controlling a computer used in the game machine, and a computer program.

Solution to Problem

In order to solve the above problems, a game machine according to the present invention includes a physical lottery mechanism that selects at least one of first choices each of which is associated with a predetermined privilege by a lottery using motion of a physical lottery medium, and uses a lottery result of the physical lottery mechanism for provision of the predetermined privilege so that a predetermined privilege associated with a first choice selected by the physical lottery mechanism is provided, the game machine comprises: a provision stopping device that stops the provision of the predetermined privilege using the lottery result of the physical lottery mechanism when the physical lottery mechanism satisfies a predetermined stop condition; a choice lottery device that selects at least one of second choices each of which is associated with the predetermined privilege by an electronic lottery when the provision stopping device stops the provision of the predetermined privilege; and a privilege providing device that provides a predetermined privilege associated with a second choice selected by the choice lottery device based on a lottery result of the choice lottery device.

According to the present invention, when a predetermined stop condition is satisfied, a method of providing a privilege is switched from provision of a privilege using a physical lottery mechanism to provision of a privilege using a lottery result of an electronic lottery. A lottery result of an electronic lottery is not affected by wrongdoing using a physical phenomenon or inadequacy of a physical lottery mechanism. Accordingly, appropriateness of a lottery result can be guaranteed.

Also, in order to solve the above problems, a control method of controlling a computer according to the present invention is a control method of controlling a computer which is incorporated in a game machine including a physical lottery mechanism that selects at least one of first choices each of which is associated with a predetermined privilege by a lottery using motion of a physical lottery medium, and using lottery result of the physical lottery mechanism for provision of the predetermined privilege so that a predetermined privilege associated with a first choice selected by the physical lottery mechanism is provided, wherein the control method of controlling the computer comprises the steps: a provision stopping step that stops the provision of the predetermined privilege using the lottery result of the physical lottery mechanism when the physical lottery mechanism satisfies a predetermined stop condition; a choice lottery step that selects at least one of second choices each of which is associated with the predetermined privilege by an electronic lottery when the provision of the predetermined privilege is stopped in the provision stopping step; and a privilege providing step that provides a predetermined privilege associated with a second choice selected in the choice lottery step based on a lottery result of the choice lottery step.

Also, in order to solve the above problems, a computer program for a game machine according to the present invention is a computer program for a game machine being configured to cause a computer, which is incorporated into a game machine including a physical lottery mechanism that selects at least one of first choices each of which is associated with a predetermined privilege by a lottery using motion of a physical lottery medium, and using a lottery result of the physical lottery mechanism for provision of the predetermined privilege so that a predetermined privilege associated with a first choice selected by the physical lottery mechanism is provided, to function as: a provision stopping device that stops the provision of the predetermined privilege using the lottery result of the physical lottery mechanism when the physical lottery mechanism satisfies a predetermined stop condition; a choice lottery device that selects at least one of second choices each of which is associated with the predetermined privilege by an electronic lottery when the provision stopping device stops the provision of the predetermined privilege; and privilege providing device that provides a predetermined privilege associated with a second choice selected by the choice lottery device based on a lottery result of the choice lottery device.

DESCRIPTION OF EMBODIMENTS

Figure 1:
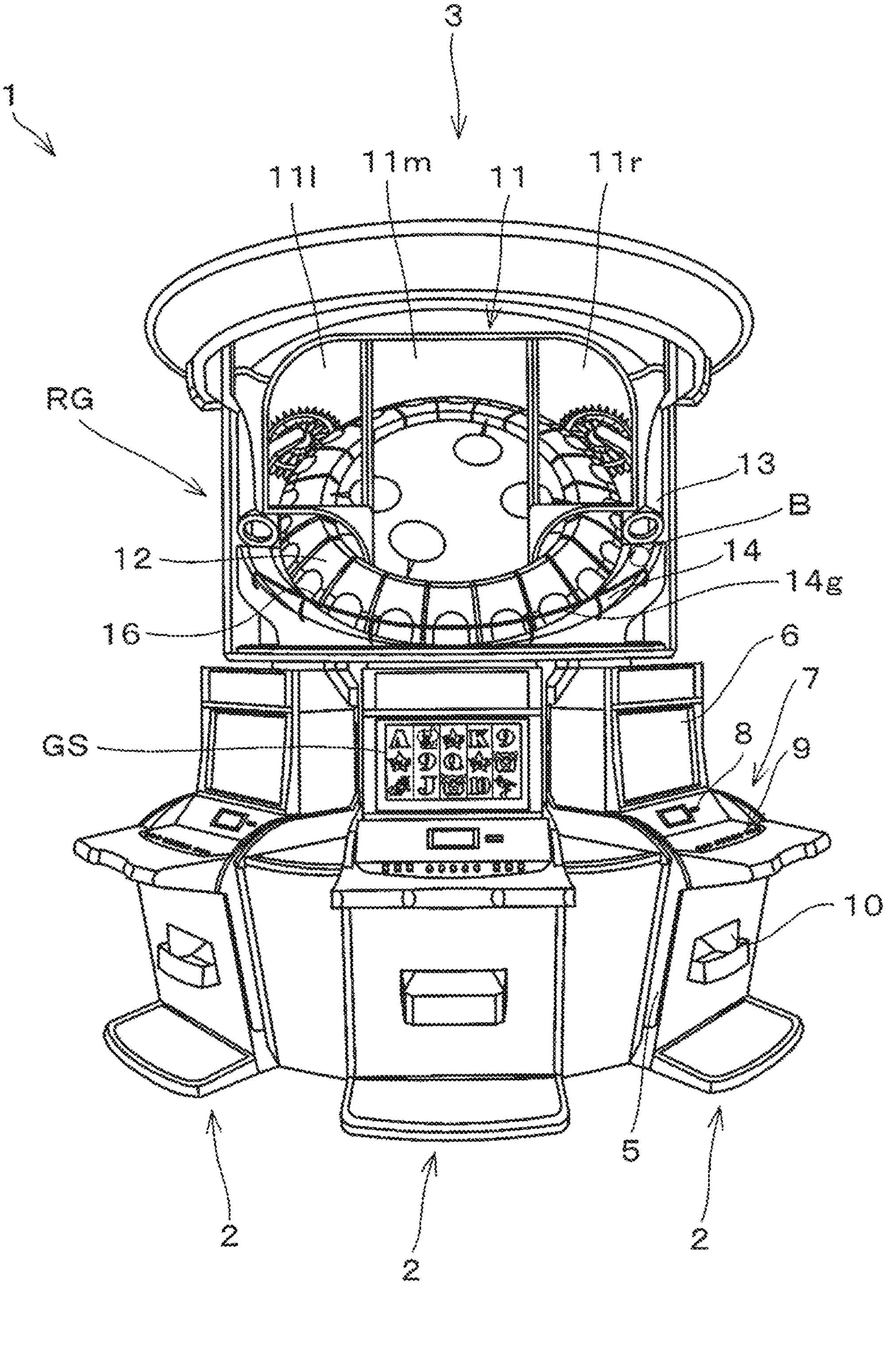
FIG. 1 is an external appearance view of a game machine according to an embodiment of the present invention.

Hereinafter, a game machine according to an embodiment of the present invention will be described with reference to the accompanying drawings. FIG. 1 is an external appearance view of a game machine according to an embodiment of the present invention. As seen in FIG. 1, a game machine 1 includes three station units 2 and a center unit 3. The three station units 2 are arranged around the center unit 3. In addition, although the three station units 2 are installed as seen in FIG. 1, the number of station units 2 may be an appropriate number. For example, the number of station units 2 may be one (1).

For example, the station unit 2 provides a slot game in exchange for consumption of coins as a game value. The slot game refers to a well-known game in which displays of symbols change according to a lottery result, and a predetermined privilege is given when a combination of changed displays of symbols forms a predetermined winning arrangement. The station unit 2 includes a housing 5. A station monitor 6 as a station display device is provided on a front surface of the housing 5. A game screen GS for executing a slot game is displayed on the station monitor 6. For example, a liquid crystal display (LCD) device is used as the station monitor 6. A control panel 7 is provided below the station monitor 6. The control panel 7 includes a coin slot 8 and an operation device 9. For example, the operation device 9 includes an operation member such as a button switch for performing various operations such as a bet operation. A coin-payout opening 10 is provided below the control panel 7.

Meanwhile, the center unit 3 provides a so-called roulette game (an opportunity of a lottery) through the station unit 2 when a predetermined game condition is satisfied. The roulette game refers to a well-known game in which a lottery is executed using a circular roulette wheel and a ball that rotates along the outer circumference of the roulette wheel. Typically, the roulette wheel includes pockets for accommodating a ball, and the pockets are provided along the outer circumference of the roulette wheel. And, a privilege is provided according to a pocket into which a ball has gone. For example, a condition whose requirement is satisfied when specific symbols form a winning arrangement in a slot game is employed as the predetermined game condition.

However, the predetermined game condition is not limited to this. For example, various conditions related to the slot game such as a condition satisfied when a winning arrangement is formed a predetermined number of times or more, or a condition satisfied when a specific winning arrangement is formed may be used as the predetermined game condition. Alternatively, when a game other than a slot game is executed by the station unit 2, various conditions related to the game may be employed as the predetermined game condition.

Figure 2:
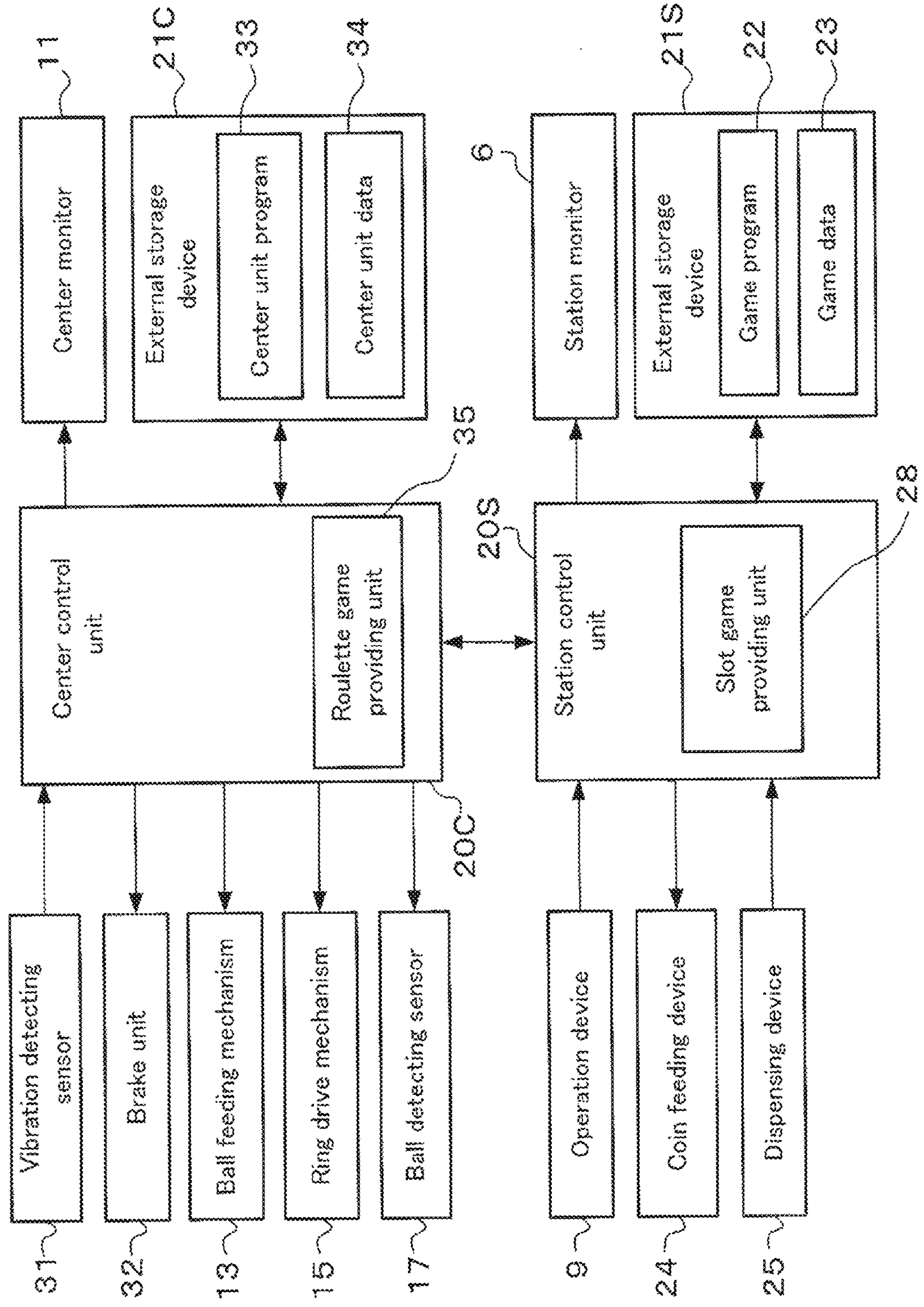
FIG. 2 is a functional block diagram describing a schematic configuration of a control system of a game machine.

The center unit 3 includes a center monitor 11 as a center display device and a roulette game unit RG as a physical lottery mechanism. The roulette game unit RG includes a roulette ring 12, a ball feeding mechanism 13, and a ball guidepath 14. The roulette ring 12 is arranged such that a front side (a side at which the station unit 2 is arranged) of the roulette ring 12 is positioned downwardly, a rear side of an opposite side thereto is positioned upwardly, and so the roulette ring 12 is inclined. Further, the roulette ring 12 is arranged below the center monitor 11 so that the rear side of the roulette ring 12, i.e., an upper portion of the inclination is hidden by the center monitor 11. The roulette ring 12 is rotationally driven in a predetermined direction at a predetermined speed by a ring drive mechanism 15 as seen in FIG. 2. Pockets 16 as first choices are provided around the roulette ring 12. Each of the pockets 16 is associated with a predetermined privilege.

The ball feeding mechanism 13 is a mechanism for feeding a ball B as a physical lottery medium to the ball guidepath 14. In other words, the ball B is fed to the ball guidepath 14 by the ball feeding mechanism 13. The ball guidepath 14 is formed so as to be extended along the outer circumference of the roulette ring 12. A guard 14*g* for limiting the movement of the ball B is provided at an outer circumference side of the ball guidepath 14, i.e., the opposite side of the roulette ring 12. The guard 14*g* limits the movement of the ball B to prevent the ball B from straying from the ball guidepath 14. That is, the ball guidepath 14 is formed to limit the moving range of the ball B fed by the ball feeding mechanism 13 to a certain range so as to be able to guide the ball B to the pocket 16 of the roulette ring 12. A ball detecting sensor 17 as seen in FIG. 2 is provided in each of the pockets 16 so that the pocket 16 into which the ball B has gone can be detected.

Meanwhile, the center monitor 11 includes three monitors 11*l*, 11*m*, and 11*r*. These three monitors 11*l*, 11*m*, and 11*r* are used so as to function as one center monitor. These monitors 11*l*, 11*m*, and 11*r* are represented as the center monitor 11 when it is not necessary to separate them. The center monitor 11 displays an image for making up for the hidden portion of the roulette ring 12. Specifically, as seen in FIG. 1, the center monitor 11 displays an image corresponding to the hidden portion of the roulette ring 12 such that the image has continuity with the roulette ring 12. With the rotation of the roulette ring 12, an image corresponding to the roulette ring 12 displayed on the center monitor 11 rotates so as to virtually show the rotation of the roulette ring 12. Similarly, when the roulette ring 12 stops, the image corresponding to the roulette ring 12 displayed on the center monitor 11 also stops. The display of the image is realized by simulating operations of the roulette ring 12, that is, rotation and stop of the roulette ring 12.

When a roulette game starts, the roulette ring 12 starts the rotation. Also, the ball B is fed to the ball guidepath 14 by the ball feeding mechanism 13. The fed ball B moves along the ball guidepath 14. Since the roulette ring 12 is inclined such that the front side is positioned downwardly, the ball guidepath 14 is similarly inclined. Thus, the fed ball B moves toward the opposite side of the ball feeding mechanism 13 along the ball guidepath 14, but the ball B changes its moving direction in the middle of the inclination and moves to return to the side of the ball feeding mechanism. After this movement is repeated several times, the moving range of the ball B converges to the lowermost position of the ball guidepath 14, i.e., the lowermost position of the roulette ring 12. Then, the ball B goes into any one of the pockets 16 (mainly, the pocket 16 at the lowermost position at an appropriate time) of the roulette ring 12 at an appropriate time. A player is given a predetermined privilege associated with the pocket 16 into which the ball has gone.

Next, a configuration of a control system of the game machine 1 will be described with reference to FIG. 2. FIG. 2 is a functional block diagram describing a schematic configuration of a control system of the game machine 1. As seen in FIG. 2, the game machine 1 includes a center control unit 20C and a station control unit 20S. The station control unit 20S is configured as a computer unit that controls the station unit 2. Specifically, the station control unit 20S is configured as a computer unit that includes a microprocessor, a main storage device necessary for an operation thereof, and other peripheral devices. The station control unit 20S is provided for each station unit 2 as a component of the station unit 2. The center control unit 20C and each station control unit 20S are connected to each other so that transmission and reception of information can be performed therebetween.

Further, the station control unit 20S is connected to an external storage device 21S. As the external storage device 21S, for example, there is used a storage medium that can retain stored information without a power supply including a magnetic storage medium such as a hard disk (HD), an optical storage medium such as a digital versatile disc read only memory (DVD-ROM), a non-volatile semiconductor memory such as electrically erasable programmable read only memory (EEPROM), and the like.

The external storage device 21S stores a game program 22 and game data 23. The game program 22 refers to a program necessary for the station unit 2 to execute a slot game. The game data 23 refers to a variety of data used when the game program 22 is executed. The game program 22 is appropriately read and executed by the station control unit 20S. The game data 23 is appropriately read and referred by the station control unit 20S. The game program 22 includes a variety of program modules necessary for executing a game, but the program modules are not shown in the figure. Similarly, the game data 23 further includes a variety of data such as reel data, sound effect data, and dividend data, but the data are also not shown in the figure.

As the game program 22 is executed, a slot game providing unit 28 is provided in the station control unit 20S. The slot game providing unit 28 executes a process necessary for the station unit 2 to provide a slot game. For example, the slot game providing unit 28 executes processes such as a process of changing a display of symbols, a process of generating a random number with a predetermined number of digits, a process of selecting symbols to be displayed after a change using the random number by lottery, and a process for determining whether or not a combination of symbols after a change has formed a winning arrangement. The slot game providing unit 28 is a logical device implemented by a combination of a microprocessor and software. In addition, a random number may be generated by a physical device into which an electronic circuit is incorporated. Further, a logical device or a physical device necessary for implementing a slot game is appropriately provided in the station control unit 20S; however, both of the devices are not shown in the figure.

Further, the station control unit 20S is connected to the operation device 9 and the station monitor 6. The operation device 9 outputs a signal corresponding to a player's operation to the station control unit 20S. The station monitor 6 displays an image corresponding to an image signal output from the station control unit 20S. The station control unit 20S executes a game in a predetermined sequence according to the game program 22 with reference to the output signal of the operation device 9. By doing so, the station control unit 20S causes a game screen corresponding to a status of a slot game to be displayed on the station monitor 6.

Further, the station control unit 20S is connected to a coin feeding device 24 and a dispensing device 25 which function as an input device and an output device necessary for executing a slot game, respectively. The coin feeding device 24 receives a coin in exchange for playing a game through the coin slot 8. Then, the coin feeding device 24 outputs a signal corresponding to the amount of fed coins to the station control unit 20S.

The dispensing device 25 pays coins to a player as a dividend of a game according to an instruction from the station control unit 20S. A coin is paid through the coin-payout opening 10. In addition, a payment to be received and a dividend for a player are not limited to a coin. For example, a medal, a token, or the like may be used as an alternative currency. Or, an accounting method capable of exchanging a currency value or a game value through an exchange of an electronic currency or other electronic information may be used. In this case, an information communication device for mutually exchanging electronic information, a storage medium for storing exchanged information, and the like may be used instead of the coin slot 8 and the coin-payout opening 10.

Meanwhile, the center control unit 20C is configured as a computer unit that controls the center unit 3. Specifically, the center control unit 20C is configured as a computer unit that includes a microprocessor, a main storage device necessary for an operation thereof, and other peripheral devices. The center control unit 20C is connected to a vibration detecting sensor 31 and a brake unit 32 in addition to the center monitor 11, the ring drive mechanism 15, the ball feeding mechanism 13, and the ball detecting sensor 17 described above. The vibration detecting sensor 31 is configured so as to detect vibration (shaking) occurring in the center unit 3 and output the detection result to the center control unit 20C. The brake unit 32 operates to stop rotation of the roulette ring 12.

Further, the center control unit 20C is connected to an external storage device 21C. As the external storage device 21C, for example, there is used a storage medium that can retain stored information without power supply including a magnetic storage medium such as a HD, an optical storage medium such as a DVD-ROM, a non-volatile semiconductor memory such as EEPROM, and the like.

The external storage device 21C stores a center unit program 33 and center unit data 34. The center unit program 33 refers to a program necessary for the center unit 3 to execute the roulette game. The center unit data 34 refers to a variety of data used when the center unit program 33 is executed. The center unit program 33 is appropriately read and executed by the center control unit 20C. The center unit data 34 is appropriately read and referred by the center control unit 20C. The center unit program 33 includes a variety of program modules necessary for executing a roulette game. Similarly, the center unit data 34 further includes a variety of data such as sound effect data, dividend data, and data for associating each of the pockets 16 with a predetermined privilege; however, both the programs and the data are not shown in the figure.

As the center unit program 33 is executed, a roulette game providing unit 35 is provided in the center control unit 20C. The roulette game providing unit 35 executes a process necessary for the center unit 3 to provide the roulette game. For example, the roulette game providing unit 35 executes a variety of processes such as a process for controlling the ball feeding mechanism 13, a process for controlling the ring drive mechanism 15, a process for controlling the brake unit 32, and a process for executing a fail-safe mode based on an output result of the vibration detecting sensor 31 or the like.

Next, the fail-safe mode will be described. As described above, the center unit 3 provides a roulette game using the roulette game unit RG. Further, the roulette game unit RG is configured as a physical lottery mechanism for executing a lottery using the ball B as a physical lottery medium. Thus, for example, a physical phenomenon that the roulette ring 12 is shaken and the like, has the potential to affect a lottery result. Further, since such the phenomenon occurs even by wrongdoing (cheating), a lottery result has also the potential to be affected by wrongdoing. Further, when inadequacy (malfunctions) is generated at control of various devices necessary for obtaining a lottery result such as the ring drive mechanism 15 or the brake unit 32 (in other words, control of the roulette game unit RG), an appropriate lottery result may not be obtained. When information that may be inferred as wrongdoing or the inadequacy of control of the roulette game unit RG has been detected, the game machine 1 transitions from a normal mode using the roulette game unit RG for a lottery to a fail-safe mode using a video lottery.

Figure 3:
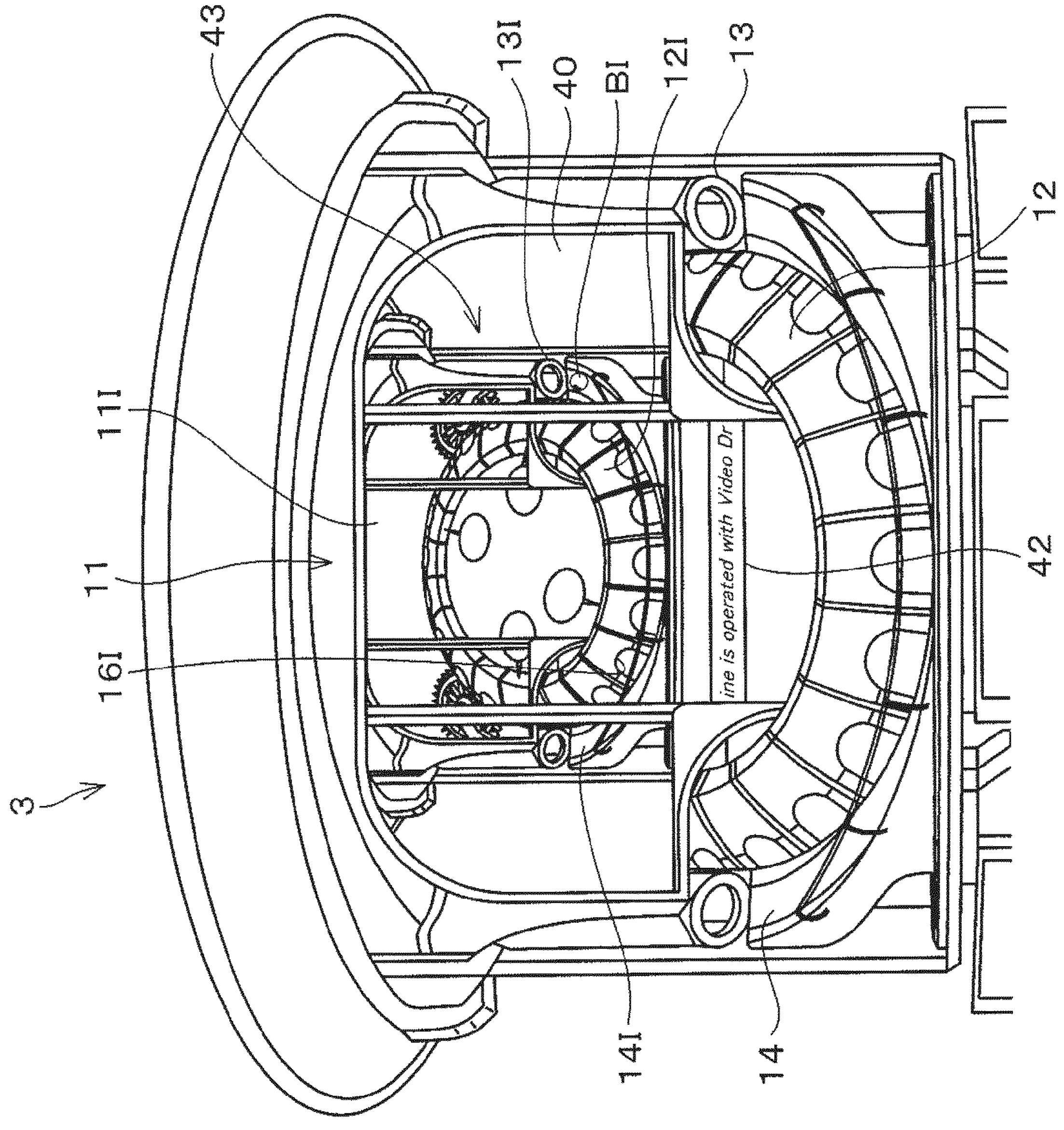
FIG. 3 is an explanatory diagram for describing an example of a fail-safe mode.

FIG. 3 is an explanatory diagram for describing an example of the fail-safe mode. As seen in FIG. 3, the roulette ring 12 is locked in the fail-safe mode. In other words, rotation of the roulette ring 12 is stopped, and then the roulette ring 12 is fixed not to rotate. The center monitor 11 displays a video lottery screen 40 as a lottery result screen. The video lottery screen 40 includes an information notification area 42. Information for notifying that a current state is the fail-safe mode is displayed on the information notification area 42.

Further, an image representing a lottery result is displayed on the video lottery screen 40. In the example of FIG. 3, a center unit image 43 is displayed on the video lottery screen 40 as an example of the image. The center unit image 43 is an image emulating the center unit 3. Thus, the center unit image 43 includes images respectively corresponding to the center monitor 11, the roulette ring 12, the ball feeding mechanism 13, and the ball guidepath 14. Specifically, a monitor image 11I, a ring image 12I, a feeding mechanism image 13I, and a guidepath image 14I are included as the corresponding images. The images are displayed in the same manner as an arrangement of the center monitor 11, the roulette ring 12, the ball feeding mechanism 13, and the ball guidepath 14. The center unit image 43 further includes a ball image BI.

Each image is displayed so as to reproduce, for example, motion of actual objects corresponding to each image. Specifically, the ring image 12I expresses rotation and stop so as to reproduce rotation and stop operations of the roulette ring 12. The feeding mechanism image 13I expresses the appearance of the ball image BI so as to reproduce feeding of the ball B by the ball feeding mechanism 13. Further, the ball image BI expresses a movement of the ball B according to the guidepath image 14I so as to reproduce a movement of the ball B. The ring image 12I includes a pocket image 16I as a second choice corresponding to each pocket 16. And, an image showing that the ball image BI is going into the pocket image 16I is reproduced at an appropriate time. Further, the monitor image 11I includes an image for making up for the hidden portion of the ring image 12I. In other words, in the example of FIG. 3, motion of the actual center unit 3 is reproduced by the center unit image 43. Then, a lottery progress (an interim progress of a lottery) and a lottery result are displayed on the center monitor 11 through the video lottery screen 40 including the center unit image 43. As described above, transition from a physical lottery using the roulette game unit RG to a video lottery using the video lottery screen 40 is made in the fail-safe mode. In the video lottery, an electronic lottery is executed, and through the images included in the video lottery screen 40, a lottery progress of the video lottery is reproduced, and a result of the video lottery is notified. Thus, the lottery result of the video lottery is not affected by physical wrongdoing such as vibration or the inadequacy of control of the roulette game unit RG.

Figure 4:
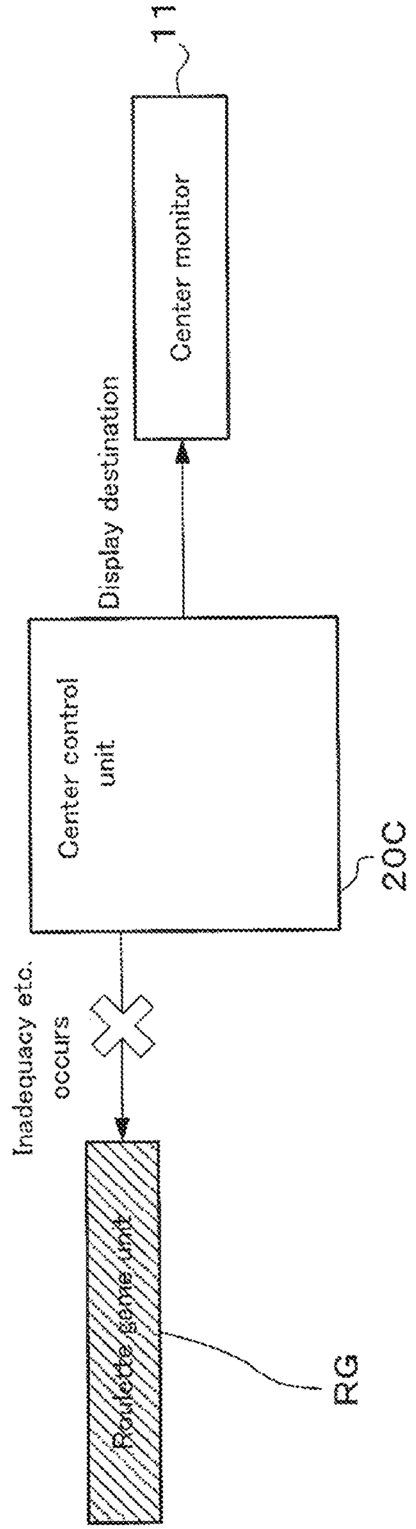
FIG. 4 is an explanatory view for describing a first display destination of a video lottery screen.

Next, a display destination of the video lottery screen 40 will be described with reference to FIGS. 2, 4, and 5. As seen in FIG. 2, the center control unit 20C that controls the roulette game unit RG is connected to the center monitor 11. Further, the center control unit 20C is connected to the station monitor 6 via the station control unit 20S. FIG. 4 is an explanatory view for describing a first display destination of the video lottery screen 40. As described in FIG. 4, when the inadequacy, wrongdoing, or the like occurs in the roulette game unit RG and so the roulette game unit RG is unusable, the center monitor 11 is first selected as the display destination of the video lottery screen 40. In other words, in this case, the video lottery screen 40 is displayed on the center monitor 11 as in the example of FIG. 3. Further, in this case, the center monitor 11 functions as a result notice display device of the present invention.

Figure 5:
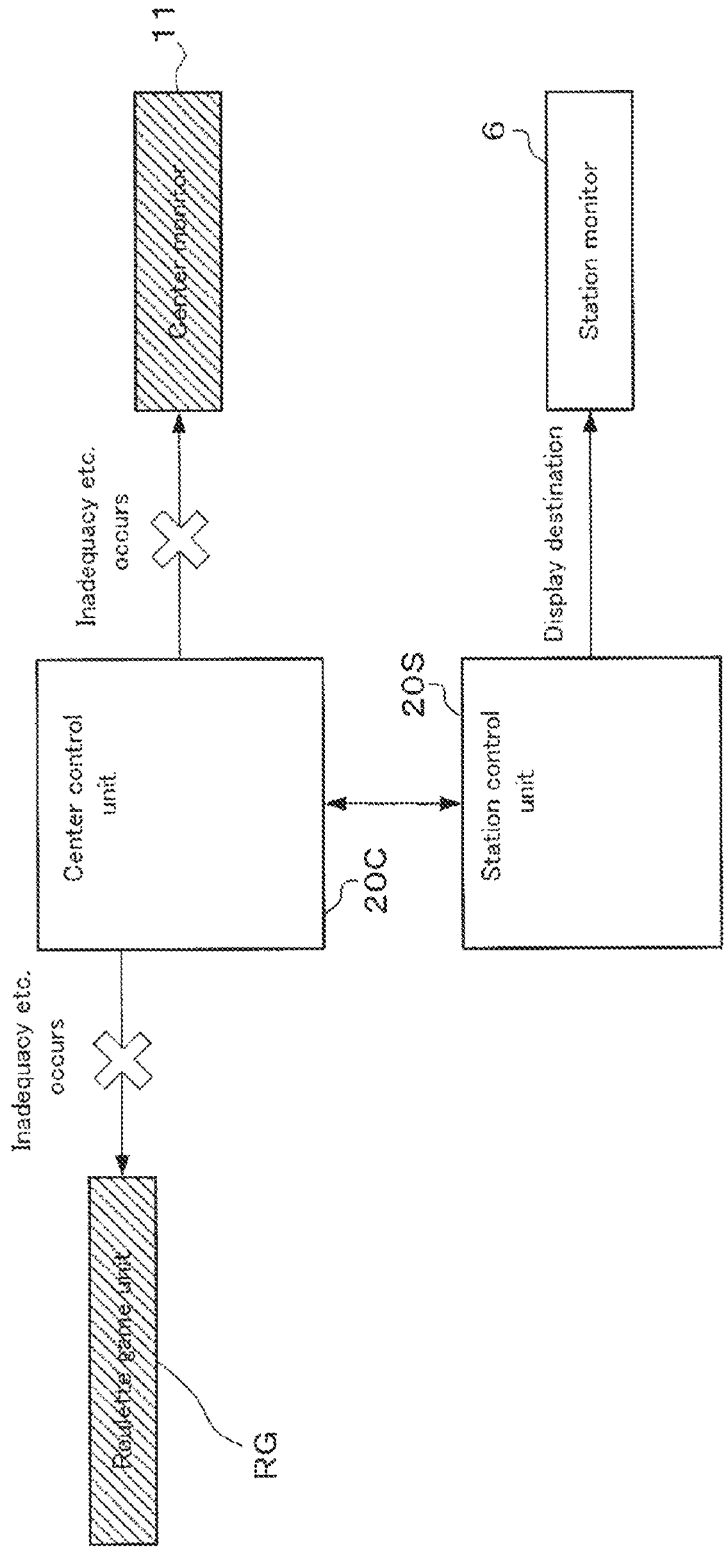
FIG. 5 is an explanatory view for describing a second display destination of a video lottery screen.

FIG. 5 is an explanatory view for describing a second display destination of the video lottery screen 40. As seen in FIG. 5, when the inadequacy or wrongdoing occurs in the roulette game unit RG and the inadequacy or the like occurs even in the center monitor 11, that is, when both the roulette game unit RG and the center monitor 11 are unusable, the station monitor 6 is selected as the display destination of the video lottery screen 40. In other words, in this case, the video lottery screen 40 is displayed on the station monitor 6 through the station control unit 20S. In this case, the station monitor 6 functions as the result notice display device of the present invention. As described above, transition from the normal mode to the fail-safe mode is made in a range in which the display destination of the video lottery screen 40 is selectable.

Figure 6:
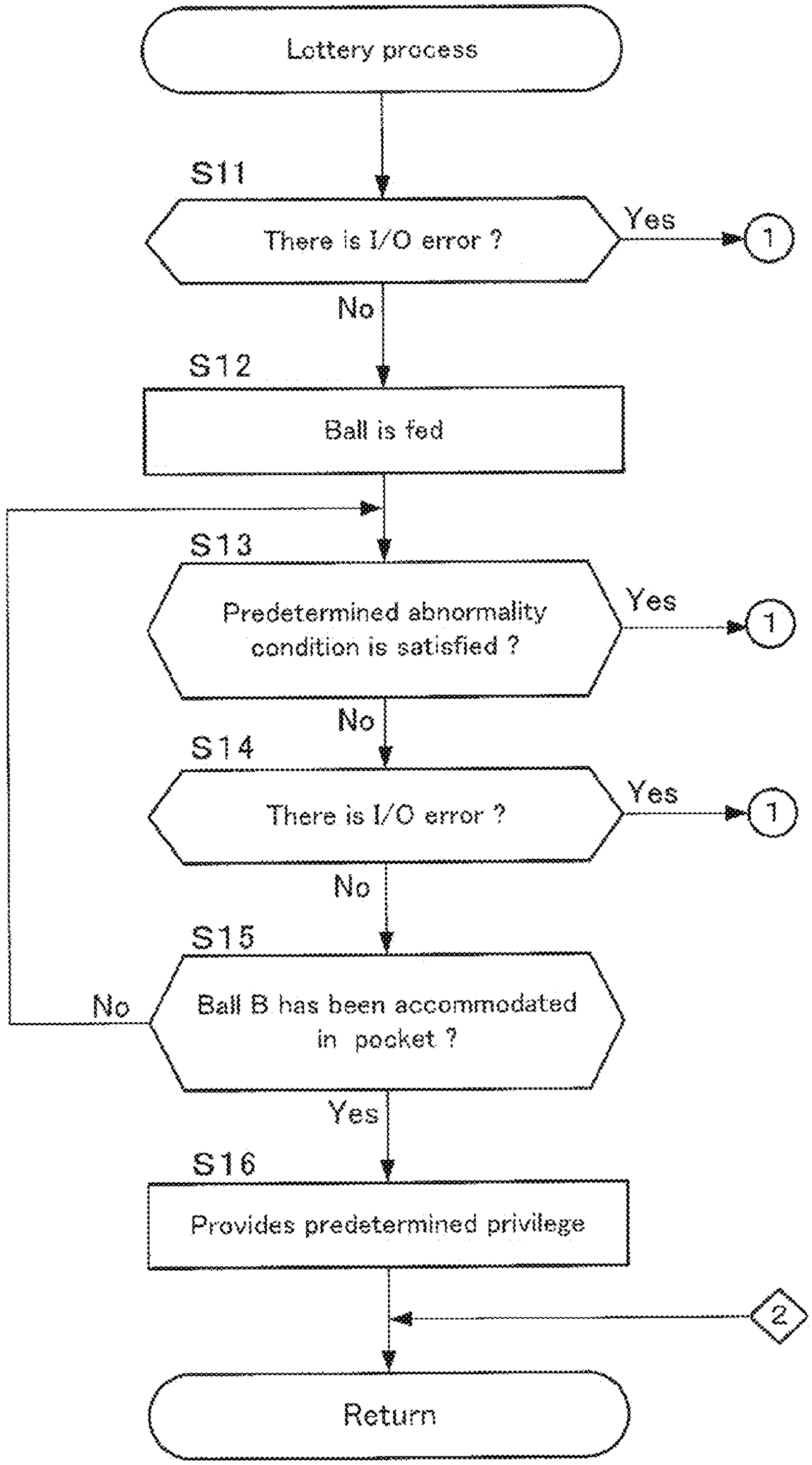
FIG. 6 is a view illustrating an example of a flowchart of a lottery process routine.
Figure 7:
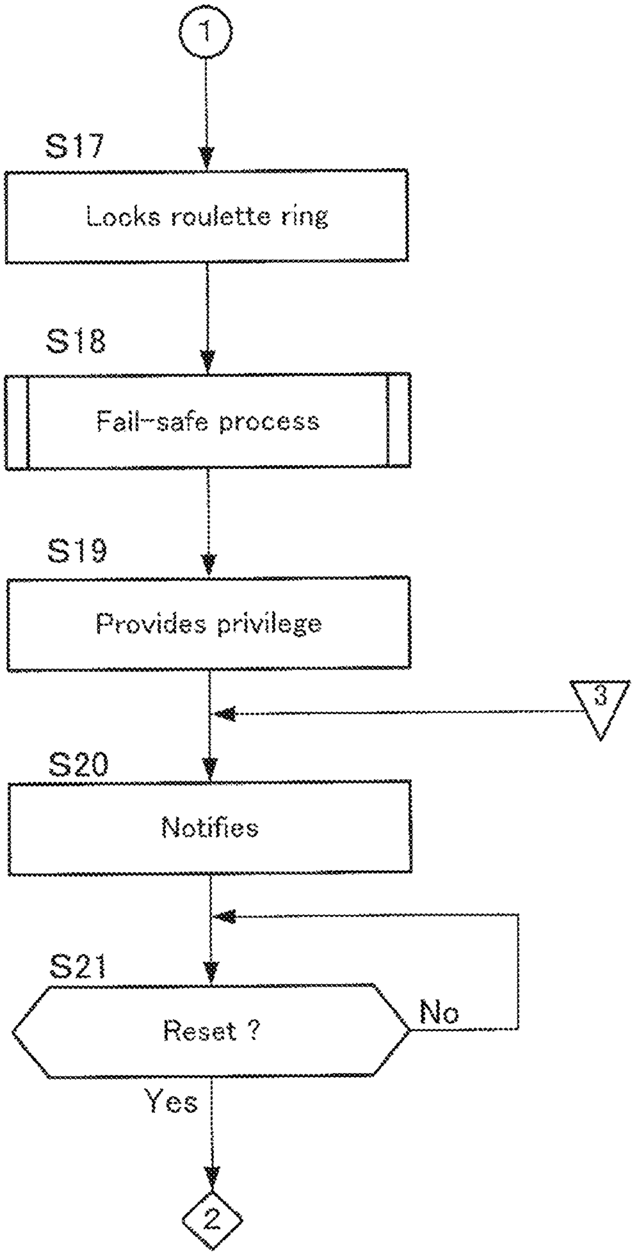
FIG. 7 is a view illustrating an example of a flowchart subsequent to FIG. 6.

Next, a lottery process and a fail-safe process executed by the center control unit 20C will be described. FIGS. 6 and 7 are views describing an example of a flowchart of a lottery process routine. The center control unit 20C executes the routines of FIGS. 6 and 7 through the roulette game providing unit 35. Further, the roulette game providing unit 35 executes the routines of FIGS. 6 and 7 every time a roulette start condition is satisfied. For example, a predetermined game condition may be employed as the roulette start condition. In other words, the roulette game providing unit 35 may execute the routines of FIGS. 6 and 7 every time a predetermined game condition is satisfied. Alternatively, the roulette game start condition may be satisfied when a predetermined operation is executed or predetermined information is notified to the player after a predetermined game condition is satisfied. In addition, in addition to the lottery process and the fail-safe process, the center control unit 20C executes various well-known processes for executing a slot game, but a description thereof is omitted.

When the routine of FIG. 6 starts, in step S11, the roulette game providing unit 35 first determines whether or not there is an I/O error in the roulette game unit RG. Here, the I/O denotes an input and output of data. In other words, in step S11, the roulette game providing unit 35 determines whether or not there is an input error (an input failure) or an output error (an output failure) of data between the center control unit 20C and the roulette game unit RG. The I/O error of the roulette game unit RG is determined based on I/O errors of various mechanisms or units, included in the roulette game unit RG, such as the ring drive mechanism 15 and the brake unit 32. In other words, when an I/O error has occurred in any one of various mechanisms or the like included in the roulette game unit RG, the roulette game providing unit 35 obtains a negative determination result. However, when no I/O error occurs in any of various mechanisms, the roulette game providing unit 35 obtains a positive determination result. When the negative determination result is obtained, the roulette game providing unit 35 proceeds to step S12. In this case, information indicating an input error between the center control unit 20C and the roulette game unit RG severs as input error information of the present invention, and information indicating an output error therebetween serves as output error information of the present invention. An I/O error in the roulette game unit RG serves as a predetermined error condition of the present invention. That is, when there is an I/O error in the roulette game unit RG, a predetermined error condition of the present invention is satisfied.

In step S12, the roulette game providing unit 35 controls the ball feeding mechanism 13 such that the ball is fed to the ball guidepath 14. Subsequently, in step S13, the roulette game providing unit 35 determines whether or not a predetermined abnormality condition is satisfied. For example, as the predetermined abnormality condition, there is employed a condition satisfied when vibration (shaking) of a predetermined value or more occurs. The intensity of vibration is acquired based on an output signal of the vibration detecting sensor 31. In other words, in step S13, for example, the roulette game providing unit 35 determines whether or not vibration of a predetermined value or more has occurred based on the output signal of the vibration detecting sensor 31. When vibration of a predetermined value or more has not occurred, that is, when the abnormality condition has not been satisfied, the roulette game providing unit 35 proceeds to step S14. In addition, the predetermined abnormality condition is not limited to the condition using vibration of a predetermined value or more as a physical phenomenon. For example, conditions using various physical phenomena which can be related to wrongdoing such as an inclination of a predetermined value or more, an impact of a predetermined value or more, and the like may be employed as the predetermined abnormality condition.

Next, in step S14, the roulette game providing unit 35 determines whether or not there is an I/O error in the roulette game unit RG again. The roulette game providing unit 35 also determines as the I/O error in the step s14 when the time out error has occurred by elapsing for a predetermined time while the ball B does not go into the pocket 16 due to the cases that the ball B jumps out form the ball guidepath 14 or the like. When a negative determination result is obtained, that is, when an I/O error has not occurred in the roulette game unit RG, the roulette game providing unit 35 proceeds to step S15. In step S15, the roulette game providing unit 35 determines whether or not the ball B has been accommodated in the pocket 16. This determination is executed with reference to an output signal of the ball detecting sensor 17. When a negative determination result is obtained, that is, when the ball B has not gone into the pocket 16, the roulette game providing unit 35 returns to step S13, and the subsequent processes are executed again. However, when a positive determination result is obtained, that is, when the ball B has gone into the pocket 16, the roulette game providing unit 35 proceeds to step S16.

In step S16, the roulette game providing unit 35 provides the player with a predetermined privilege associated with the pocket 16 into which the ball B has gone. Specifically, first the roulette game providing unit 35 specifies the pocket 16 into which the ball B has gone based on the output signal of the ball detecting sensor 17. Subsequently, a predetermined privilege associated with the specified pocket 16 is determined. Then, the determined predetermined privilege is provided to the player. The roulette game providing unit 35 provides the player with a predetermined privilege in the above-described manner, and then ends the present routine.

However, when the positive determination result is obtained in step S11, step S13, or step S14, the roulette game providing unit 35 proceeds to step S17 of FIG. 7. In step S17, the roulette game providing unit 35 locks the roulette ring 12. In other words, the roulette game providing unit 35 fixes the roulette ring 12 not to rotate. For example, the locking operation is implemented by the roulette game providing unit 35 controlling the brake unit 32 such that rotation of the roulette ring 12 is stopped and the roulette ring 12 is fixed in that state. Subsequently, in step S18, the roulette game providing unit 35 executes the fail-safe process routine. The details of the routine will be described later.

Next, in step S19, the roulette game providing unit 35 provides the player with a privilege based on the process result of step S18. Subsequently, in step S20, the roulette game providing unit 35 notifies an administrator of the game machine 1 of the current state. Specifically, the fact that the roulette ring 12 is in the locked state is notified. For example, this notice may be executed using blinking, a change in a color, or the like of various lamps (not shown) provided at the game machine 1. Or, when a management terminal (not shown) is connected via a communication line, the notice may be executed using the management terminal. Next, in step S21, the roulette game providing unit 35 determines whether or not a reset operation has been performed so as to return the state of the center unit 3 to the normal mode. For example, the reset operation is executed by the administrator. When a negative determination result is obtained, that is, when the reset operation has not been performed, the roulette game providing unit 35 repetitively executes the process of step S21 until the reset operation is performed. However, when a positive determination result is obtained in step S21, that is, when the reset operation has been performed, the roulette game providing unit 35 ends the present routine. In this case, the reset operation executed by the administrator serves as a predetermined operation of the present invention.

Figure 8:
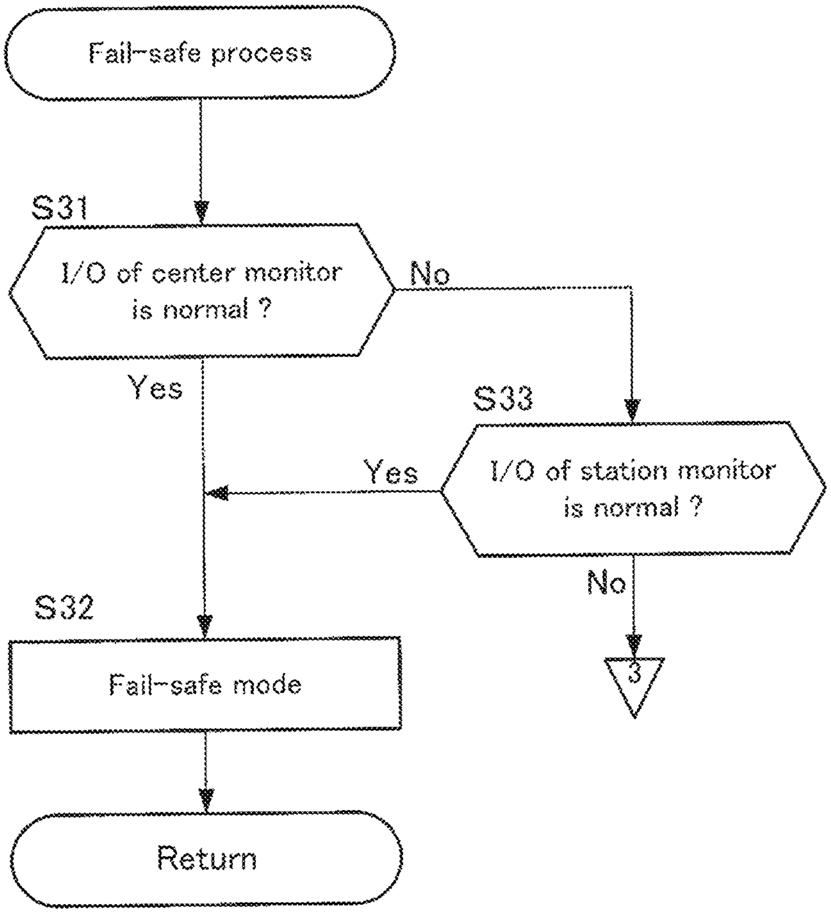
FIG. 8 is a view illustrating an example of a flowchart of a fail-safe process routine.

Next, the fail-safe process routine will be described with reference to FIG. 8. FIG. 8 is a view illustrating an example of a flowchart of the fail-safe process routine. The routine of FIG. 8 is called out and then executed in step S19 of FIG. 7 as a sub routine process of the lottery process routine of FIG. 7.

When the routine of FIG. 8 starts, in step S31, the roulette game providing unit 35 first determines whether or not an I/O of the center monitor 11 is normal. When the I/O of the center monitor is not normal, that is, when there is an error in the I/O of the center monitor 11 such as the case that the center monitor can not rotate to and can not face the front side of the station unit 2 which is played by the player or the case that the center monitor can not display normally, the roulette game providing unit 35 proceeds to step S33. In this case, the I/O of the center monitor 11 serves as a failure condition of the present invention. That is, when there is an error in the I/O of the center monitor 11, the failure condition of the present invention is satisfied.

In step S33, the roulette game providing unit 35 determines whether or not the I/O of the station monitor 6 is normal through the station control unit 20S. When a negative determination result is obtained, that is, when the I/O of the station monitor 6 is not normal, the roulette game providing unit 35 proceeds to step S20 of FIG. 7 and then the processes of steps S20 and S21 described above are executed.

However, when it is determined in step S31 that the I/O of the center monitor 11 is normal or when it is determined in step S33 that the I/O of the station monitor 6 is normal, the roulette game providing unit 35 proceeds to step S32.

In step S32, the roulette game providing unit 35 executes the fail-safe mode. Specifically, as the fail-safe mode, the roulette game providing unit 35 executes a video lottery, decides a privilege to be provided to the player, and notifies the player of the progress or the result of the lottery through the video lottery screen 40. In the fail-safe mode, the roulette game providing unit 35 executes various well-known processes for executing a video lottery such as a process for generating a random number, a process for acquiring the random number, a process for deciding a predetermined privilege based on the random number, and a process for displaying the video lottery screen 40; however, the processes are not shown in the figure.

Further, in the fail-safe mode, the roulette game providing unit 35 executes a video lottery using the center monitor 11 when the I/O of the center monitor 11 is normal but executes a video lottery using the station monitor 6 when the I/O of the center monitor 11 is not normal. In the fail-safe mode, the roulette game providing unit 35 decides a privilege, notifies of the privilege, and then proceeds to step S19 of FIG. 7. In step S19, the roulette game providing unit 35 provides the player with a privilege based on the result of the video lottery of step S32. As the routines of FIGS. 6 to 8 are executed, it is determined whether or not the abnormality condition has been satisfied, and the presence or absence of the I/O error is detected during a game as well as before a game. In other words, when the abnormality condition has been satisfied or when there is inadequacy in the roulette game unit RG, the state of the game machine 1 can be switched from the normal mode to the fail-safe mode during a game as well as before a game as long as the I/O of the center monitor 11 or the station monitor 6 is normal.

When there is inadequacy in the I/O of the roulette game unit RG, problems may arise in the physical lottery using the roulette game unit RG. Further, the roulette game unit RG provides the roulette game using motion of the ball B as the physical lottery medium. That is, the lottery result depends on motion of the ball B. Meanwhile, motion of the ball B is affected by vibration. When vibration (shaking) of a predetermined value or more occurs, there is a possibility that wrongdoing intended to influence motion of the ball B is being conducted. In this case, there is a possibility that the lottery result using the roulette game unit RG will not be appropriate.

As described above, according to the game machine of this embodiment, vibration of a predetermined value or more occurring in the center unit 3 or the inadequacy of the roulette game unit RG is detected during a game as well as before a game. When the vibration or the inadequacy is detected, the mode is switched from the normal mode to the fail-safe mode. In other words, when there is the inadequacy in the roulette game unit RG or when there is a possibility that wrongdoing is being conducted, the video lottery is executed instead of the physical lottery. The lottery result of the video lottery is not affected, for example, by physical wrongdoing conducted on the roulette game unit RG. Thus, even when there is the inadequacy in the roulette game unit RG or even when there is a possibility that wrongdoing is being conducted, an appropriate lottery can be guaranteed. Particularly, physical wrongdoing or the like conducted during a game is highly likely to affect the lottery result of the roulette game unit RG. According to this embodiment, since wrongdoing or the like is detected even during a game and switching to the fail-safe mode is performed, influence of wrongdoing or the like conducted during a game can be appropriately eliminated.

In the above embodiment, the center control unit 20C functions as a provision stopping device and a privilege providing device by as executing the lottery process routine of FIGS. 6 and 7 through the roulette game providing unit 35. Further, the center control unit 20C functions as a choice lottery device and a display destination control device by executing the fail-safe process routine of FIG. 8 through the roulette game providing unit 35.

The present invention is not limited to the above described embodiment and can be implemented in an appropriate embodiment. In the above embodiment, the roulette game unit RG for executing the roulette game is employed as the physical lottery mechanism. However, the physical lottery mechanism is not limited to this embodiment. For example, a mechanism for executing a bingo game may be employed as the physical lottery mechanism as long as a lottery using motion of a physical lottery medium is executed.

Figure 9:
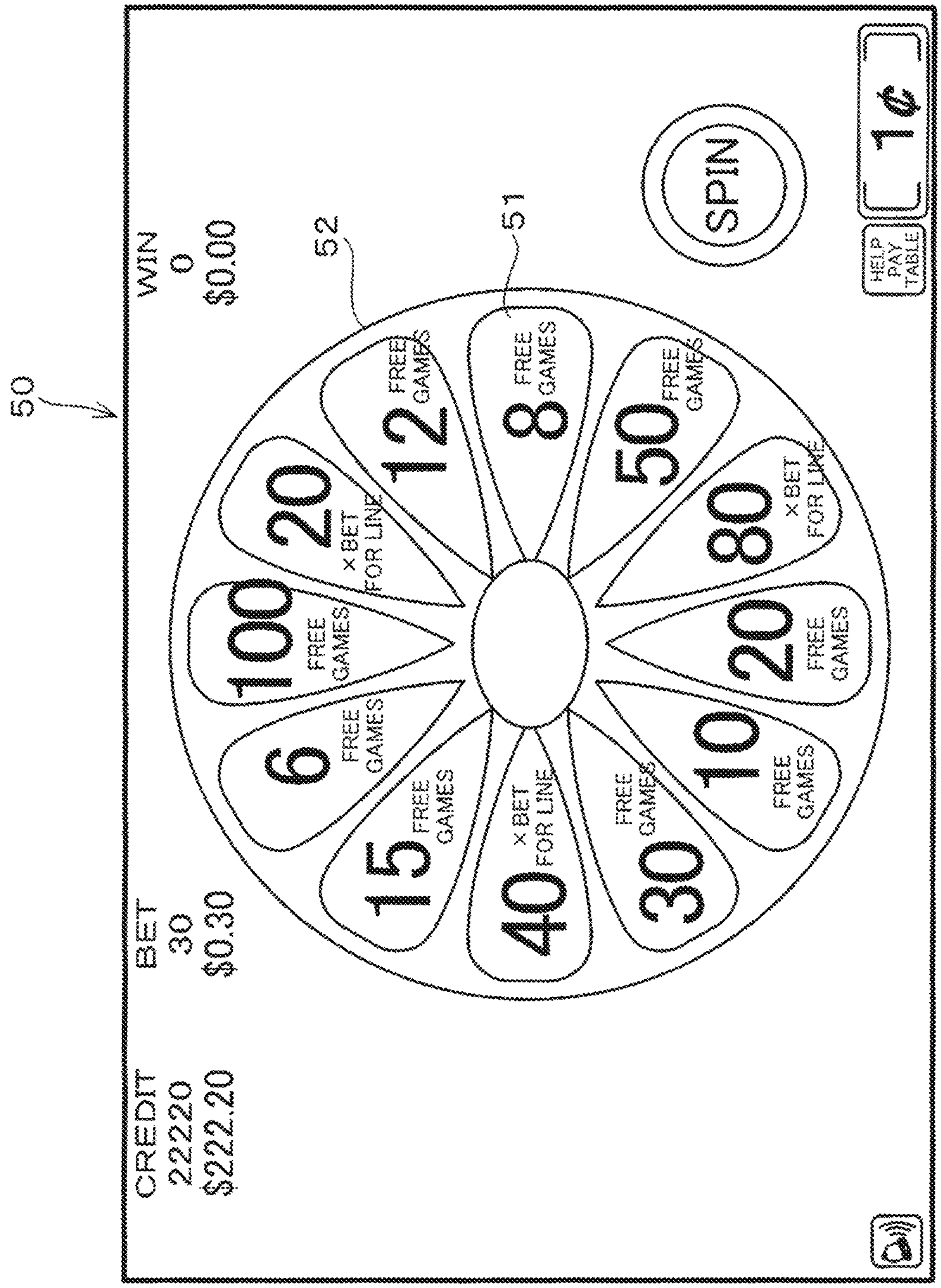
FIG. 9 is a view illustrating a first modified embodiment of a video lottery screen.

In the above embodiment, the video lottery screen 40 including the center unit image 43 modeling the center unit 3 is used for notifying of the lottery result (which may include a privilege to be provided) of the video lottery. However, the video lottery screen 40 is not limited to this embodiment. The video lottery may be implemented using various screens. For example, FIG. 9 is a view illustrating a first modified embodiment of the video lottery screen 40. As seen in FIG. 9, a roulette image 52 in which choices 51 are arranged along a circular outer circumference is displayed on a first modified screen 50 according to the first modified embodiment of the video lottery screen 40. For example, the roulette image 52 reproduces a lottery progress by sequentially changing a blinking choice as a time elapses. Further, the roulette image 52 represents a choice blinking after a predetermined lottery time elapses as a lottery result. The first modified screen 50 may be used for notifying the lottery result of the video lottery.

Figure 10:
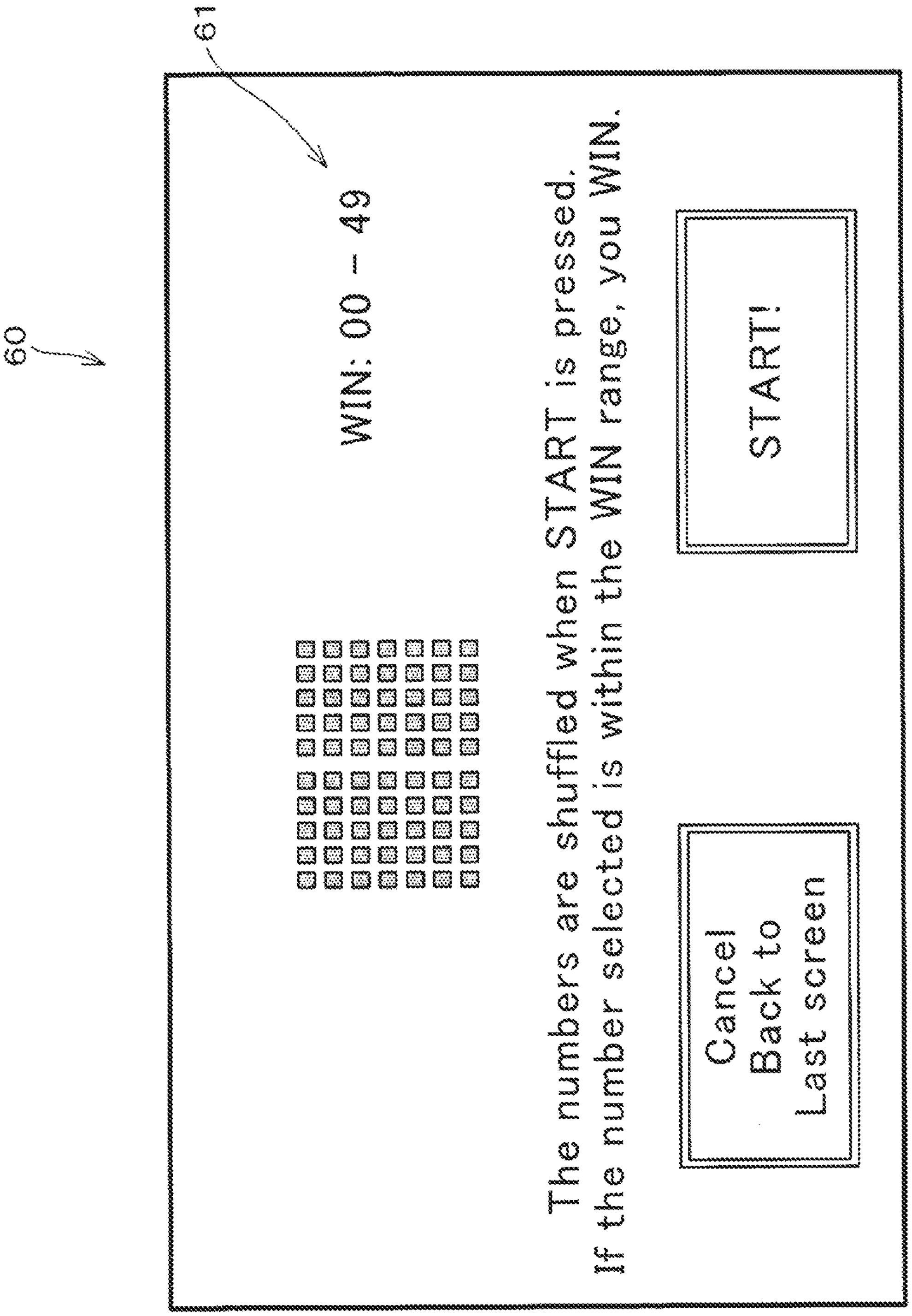
FIG. 10 is a view illustrating a second modified embodiment of a video lottery screen.

Further, in the video lottery screen 40, the pocket image 16I associated with each predetermined privilege is selected by the ball image BI. In contrast, in the first modified screen 50, one of privileges is selected directly by a lottery. An embodiment of a video lottery is not limited to these embodiments. For example, an embodiment in which a random number associated with a predetermined privilege is drawn may be employed as an embodiment of a video lottery. FIG. 10 is a view illustrating a second modified embodiment of the video lottery screen 40. As seen in FIG. 10, a second modified screen 60 according to the second modified embodiment of the video lottery screen 40 includes pseudo random number information 61 indicating a lottery result. The random number information 61 is displayed to represent a predetermined range. Then, when a previously selected number is included in the predetermined range, a predetermined privilege is provided. As described above, a random number associated with a privilege may be selected by a video lottery. Similarly, a screen including no interim progress of a lottery may be used as a screen for notifying a lottery result of a video lottery as in the second modified screen 60. In these cases, even when the center control unit 20C has no available capacity for reproducing a moving picture, a video lottery can be implemented.

Further, in the above embodiment, in the fail-safe mode, a video lottery is executed, and the lottery result is notified through a display device such as the center monitor 11. However, the fail-safe mode is not limited to this embodiment. For example, as another embodiment of the fail-safe mode, there may be employed an embodiment in which a display device is not arranged, an interim result of a lottery is not displayed, and an electronic lottery result is notified by sound.

In the above embodiment, input error information or output error information may be employed as the error information representing the malfunction of the physical lottery mechanism. However, the error information is not limited to this embodiment. For example, other processing result information for checking an operation of the physical lottery mechanism may be employed as the error information.

In the above embodiment, the abnormality condition or the error condition is employed as the predetermined stop condition of the present invention. However, the stop condition is not limited to this embodiment. For example, the player's position condition may be used as the stop condition. In other words, the player's position condition may be satisfied when it is determined that the player has entered the center unit 3 side farther than a predetermined position based on the player's position information acquired by a camera or the like. Besides, various conditions related to wrongdoing or the malfunction of the physical lottery mechanism may be employed as the stop condition.

In the above embodiment, the operation condition is employed as the predetermined recovery condition. And when the administrator executes a reset operation, the fail-safe mode is recovered to the normal mode. However, the recovery to the normal mode is not limited to this embodiment. For example, a condition satisfied when vibration of the physical lottery mechanism is less than a predetermined value may be employed as a predetermined recovery condition for recovering to the normal mode. In other words, the normal mode may be automatically recovered when vibration of the physical lottery mechanism returns to a value less than a predetermined value after a privilege is provided in the fail-safe mode.

What is claimed is:

1. A game machine including a physical lottery mechanism that selects at least one of first choices each of which is associated with a predetermined privilege by a lottery using motion of a physical lottery medium, and using a lottery result of the physical lottery mechanism for a provision of the predetermined privilege so that a predetermined privilege associated with a first choice selected by the physical lottery mechanism is provided, the game machine comprising:

a center display device that displays information related to the lottery result of the physical lottery mechanism;

a provision stopping device that stops the provision of the predetermined privilege using the lottery result of the physical lottery mechanism when the physical lottery mechanism satisfies at least a predetermined stop condition;

a center control device communicating with the center display device and including a game providing device to execute a fail-safe mode when the provision stopping device stops the provision of the predetermined privilege and executes an electronic lottery in the fail-safe mode by displaying on the center display device an electronic lottery screen including an image of the lottery result and an information notification area that a current state is the fail-safe mode;

a choice lottery device that selects at least one of second choices each of which is associated with the predetermined privilege by the electronic lottery when the provision stopping device stops the provision of the predetermined privilege; and a privilege providing device that provides a predetermined privilege associated with a second choice selected by the choice lottery device based on a lottery result of the choice lottery device.

2. The game machine according to claim 1, wherein an abnormality condition which is satisfied when a predetermined physical phenomenon occurs in the physical lottery mechanism is employed as one of the predetermined stop conditions, and the provision stopping device determines that the predetermined stop condition has been satisfied when at least the abnormality condition has been satisfied.

3. The game machine according to claim 2, wherein vibration of a predetermined value or more generated in the physical lottery mechanism is employed as the predetermined physical phenomenon.

4. The game machine according to claim 1, wherein an error condition which is satisfied when predetermined error information representing a malfunction of the physical lottery mechanism occurs is employed as one of the predetermined stop conditions, and the provision stopping device determines that the predetermined stop condition has been satisfied when at least the error condition has been satisfied.

5. The game machine according to claim 4, wherein at least one of input error information representing an input failure of information to the physical lottery mechanism and output error information representing an output failure of information from the physical lottery mechanism is employed as the predetermined error information.

6. The game machine according to claim 1, further comprising a result notice display device that displays the electronic lottery screen including a display of the lottery result of the choice lottery device when the privilege providing device provides the predetermined privilege.

7. The game machine according to claim 6, wherein the electronic lottery screen includes a display related to an interim progress of the electronic lottery by the choice lottery device.

8. The game machine according to claim 7, further comprising:

at least one station unit including a station display device that displays a game screen, being arranged around the center display device, and providing an opportunity of a lottery using the physical lottery mechanism through the game screen, wherein the center display device or the station display device corresponding to a station unit that has provided an opportunity of the lottery is used as the result notice display device.

9. The game machine according to claim 8, further comprising:

a display destination control device that controls a display destination of the electronic lottery screen such that the station display device is selected as the result notice display device when the center display device satisfies a predetermined failure condition representing a malfunction of the center display device.

10. The game machine according to claim 1, wherein the provision stopping device stops the provision of the predetermined privilege using the lottery result of the physical lottery mechanism until a predetermined recovery condition is satisfied.

11. The game machine according to claim 10, wherein an operation condition which is satisfied when a predetermined operation is executed is used as the predetermined recovery condition.

12. A control method of controlling a computer which is incorporated in a game machine including a physical lottery mechanism that selects at least one of first choices each of which is associated with a predetermined privilege by a lottery using motion of a physical lottery medium, and using a lottery result of the physical lottery mechanism for provision of the predetermined privilege so that a predetermined privilege associated with a first choice selected by the physical lottery mechanism is provided, wherein the control method of controlling the computer comprises the steps:

a center display step that displays information related to the lottery result of the physical lottery mechanism;

a provision stopping step that stops the provision of the predetermined privilege using the lottery result of the physical lottery mechanism when the physical lottery mechanism satisfies at least a predetermined stop condition;

a center control step that communicates with a center display device and includes a game providing step that executes a fail-safe mode when the provision stopping step stops the provision of the predetermined privilege and executes an electronic lottery in the fail-safe mode by displaying on the center display device an electronic lottery screen including an image of the lottery result and an information notification area that a current state is the fail-safe mode;

a choice lottery step that selects at least one of second choices each of which is associated with the predetermined privilege by the electronic lottery when the provision of the predetermined privilege is stopped in the provision stopping step; and a privilege providing step that provides a predetermined privilege associated with a second choice selected in the choice lottery step based on a lottery result of the choice lottery step.

13. A computer program for a game machine being configured to cause a computer, which is incorporated into a game machine including a physical lottery mechanism that selects at least one of first choices each of which is associated with a predetermined privilege by a lottery using motion of a physical lottery medium, and using a lottery result of the physical lottery mechanism for provision of the predetermined privilege so that a predetermined privilege associated with a first choice selected by the physical lottery mechanism is provided, to function as:

a center display device that displays information related to the lottery result of the physical lottery mechanism;

a provision stopping device that stops the provision of the predetermined privilege using the lottery result of the physical lottery mechanism when the physical lottery mechanism satisfies at least a predetermined stop condition;

a center control device that communicates with the center display device and includes a game providing device that executes a fail-safe mode when the provision stopping device stops the provision of the predetermined privilege and executes an electronic lottery in the fail-safe mode by displaying on the center display device an electronic lottery screen including an image of the lottery result and an information notification area that a current state is the fail-safe mode;

a choice lottery device that selects at least one of second choices each of which is associated with the predetermined privilege by the electronic lottery when the provision stopping device stops the provision of the predetermined privilege; and a privilege providing device that provides a predetermined privilege associated with a second choice selected by the choice lottery device based on a lottery result of the choice lottery device.

* * * * *